US006950130B1

(12) United States Patent
Qian

(10) Patent No.: US 6,950,130 B1
(45) Date of Patent: Sep. 27, 2005

(54) METHOD OF IMAGE BACKGROUND REPLACEMENT

(75) Inventor: Richard J. Qian, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/225,189

(22) Filed: Jan. 5, 1999

(51) Int. Cl.[7] .......................... H04N 5/262; H04N 9/74
(52) U.S. Cl. ...................................... 348/239; 348/586
(58) Field of Search ................................ 348/586, 239

(56) References Cited

U.S. PATENT DOCUMENTS

| | | | | |
|---|---|---|---|---|
| 4,448,200 A | | 5/1984 | Brooks et al. | 128/653 |
| 4,521,106 A | | 6/1985 | Lambeth | 356/1 |
| 5,249,039 A | | 9/1993 | Chaplin | 358/22 |
| 5,382,980 A | * | 1/1995 | Gehrmann | 348/586 |
| 5,386,242 A | | 1/1995 | Chaplin | 348/591 |
| 5,398,075 A | | 3/1995 | Freytag et al. | 348/590 |
| 5,400,081 A | | 3/1995 | Chaplin | 348/587 |
| 5,574,511 A | * | 11/1996 | Yang et al. | 348/586 |
| 5,592,236 A | | 1/1997 | Rosenbaum et al. | 348/586 |
| 5,684,887 A | * | 11/1997 | Lee et al. | 348/586 |
| 5,684,898 A | * | 11/1997 | Brady et al. | 382/282 |
| 5,710,602 A | * | 1/1998 | Gardos et al. | 348/255 |
| 5,748,775 A | | 5/1998 | Tsuchikawa et al. | 382/190 |
| 5,764,306 A | * | 6/1998 | Steffano | 348/552 |
| 5,808,682 A | * | 9/1998 | Okunoki et al. | 348/586 |
| 5,812,787 A | * | 9/1998 | Astle | 348/586 |
| 5,825,909 A | * | 10/1998 | Jang | 108/173 |
| 5,914,748 A | * | 6/1999 | Parulski et al. | 348/239 |
| 5,923,380 A | * | 7/1999 | Yang et al. | 348/586 |
| 5,937,104 A | * | 8/1999 | Henderson et al. | 348/586 |
| 6,137,919 A | * | 10/2000 | Gonsalves et al. | 348/586 |

OTHER PUBLICATIONS

Ivanov, et al. *Fast Lighting Independent Background Subtraction, MIT Media Laboratory Perceptual Computer Section Technical Report*, No. 437.

Wren, et al. *Real-Time Tracking of the Human Body, MIT Media Laboratory Perceptual Computing Section Technical Report*, No. 353. appears in *IEEE Transactions on Pattern Analysis and Machine Intelligence*, Jul. 1997, vol. 19, No. &, pp. 780-785.

Perona, et al. *Scale-Space and Edge Detection Using Anisotropic Diffusion, IEEE Transactions on Pattern Analysis and Machine Intelligence*, Jul.

* cited by examiner

*Primary Examiner*—Wendy R. Garber
*Assistant Examiner*—James M. Hannett
(74) *Attorney, Agent, or Firm*—Marger Johnson & McCollom, P.C.

(57) ABSTRACT

A method for background replacement. The method takes an input image of one or more frames of video, or a still image, and performs an initial classification of the pixels (14) as foreground or background pixels. The classification is refined (16) using one of several techniques, including anisotropic diffusion or morphological filtering. After the refined classification is completed, a feathering process (18) is used to overlay the foreground pixels from the original image on the pixels of the new background, resulting in a new output image (20).

10 Claims, 1 Drawing Sheet

METHOD OF IMAGE BACKGROUND REPLACEMENT

BACKGROUND OF THE INVENTION

1. Field of the Invention

This invention relates to image processing for image capture systems, more particularly to replacing backgrounds in captured images.

2. Background of the Invention

New applications for video technology are appearing every day. Video conferencing has become commonplace, users can easily download video clips from the Internet, and camcorders are inexpensive and widely used. As more of these applications develop, the ability to edit and change the nature of the images becomes more important.

One editing tool that remains unavailable to most of these applications is background replacement. Typically, background replacement occurs on video images filmed in front of a blue screen. The foreground and background pixels are easily identified and the new background is put in place using computers or specially designed video devices. However, for most people, filming or capturing images in front of a blue screen is impractical.

The blue screen process is expensive and inconvenient. A special studio for video conferencing restricts the availability of video conferencing facilities and requires extra cost. Most people publishing on the Internet would find use of a blue screen prohibitive, as would most typical users of camcorders. However, all of these applications can benefit from background replacement. People video conferencing could replace the background of their office with a background for reasons of privacy, security or aesthetics. Internet publishers could insert images into Web pages more seamlessly, without use of backgrounds or sets. Camcorder users could record videos and edit the backgrounds at home.

Therefore, a less expensive and more easily accessible technique for background replacement is needed.

SUMMARY OF THE INVENTION

One embodiment of the invention is a technique for background replacement. The input image or images are analyzed and a preliminary classification of the pixels is made. The classification identifies whether the pixels are more likely foreground or background. After the preliminary classification is made, a more refined process is applied that makes the final determination. Finally, the new background pixels are applied to the image, replacing the previous background pixels. The new image is composed with feathering to ensure smooth edges and transitions. The new image is then output for viewing.

It is an advantage of the invention in that it allows background replacement with no extra equipment or special settings.

It is an advantage of the invention in that it provides background replacement quickly, allowing real-time processing.

It is an advantage of the invention in that it is able to adjust for camera exposure changes and accurate in determining background pixels from foreground pixels.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
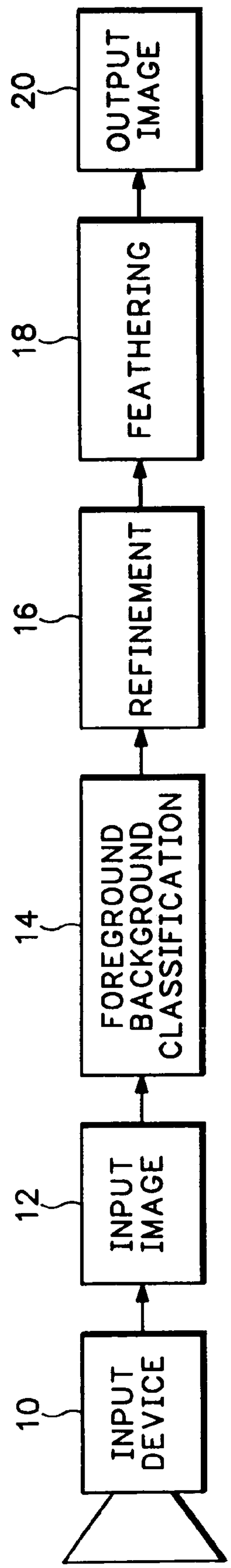
FIG. 1 shows a process for video background replacement in accordance with the invention.

One embodiment of a process for video background replacement is shown in FIG. 1. An input device in 10 is used to capture images. Devices such as these include digital cameras, camcorders, film cameras, video conferencing cameras, etc. In step 10 the current background is recorded without any foreground object or objects.

The device 10 then takes incoming frames or an incoming frame of the image with the foreground objects as the input image in step 12. For digital cameras, the input image would be that one image captured by the image input device. The input devices that are video images may capture one or more frames to use as the input image or in the input image analysis.

The input image is then analyzed using a probability function that measures the likelihood of the pixel being foreground or background. One example of such a probability function is:

$$P(p_{x,y} \in \text{Foreground}) = \begin{cases} \Phi\left(a \cdot \sqrt{(r_{x,y} - r'_{x,y})^2 + (g_{x,y} - g'_{x,y})^2} + b \cdot |I_{x,y} - I'_{x,y}| + c\right) & \text{if } I_{x,y} > \eta \\ \Phi(d \cdot |I_{x,y} - I'_{x,y}| + f) & \text{else} \end{cases}$$

and $$\Phi(u) = \min(\max(0.5 + \text{sign}(u) \cdot u^2, 0), 1)$$

where r and g are the chromatic components and l is the intensity of the pixel p; r', g' and l' are their counter parts of pixel p' in the pre-recorded background image, and a, b, c, d, f, and $\eta$ are constants. The values of these constants are tuned by experiments to determine their optimal values.

It is not necessary to restrict this process to chromatic or normalized RGB color space. Use of $YC_bC_r$ is also possible. In the $YC_bC_r$ example, the same formulas would be used, with the substitutions of Y for l, $C_b$ for g and $C_r$ for r.

Regardless of the color space used for determining the preliminary classification of a pixel, a probability map is generated that indicates the likelihood of a pixel being foreground or background. The probability map produces a value of a pixel between 0 and 1, where 0 is the foreground and 1 is the background in this particular example. These probabilities could have a threshold applied that would segment the pixels into either the foreground or background. However, this may lead to false classifications because of ambiguity in certain regions in foreground objects and the background.

Therefore, it is desirable to refine the classification result by utilizing certain context information in space. One may apply morphological filtering to eliminate isolated misclassified pixels. Other techniques are also available for this post-processing refinement in step 16. One such technique is anisotropic diffusion, which is discussed below.

Anisotropic diffusion encourages smoothing within boundaries and discourages smoothing across boundaries. In this example, the following anisotropic diffusion equation will be used:

$$P_t = \mathrm{div}(c(x,y,t)\nabla P) = c(x,y,t)\Delta P + \nabla c \cdot \nabla P,$$

where div denotes the divergence operator, and $\nabla$ and $\Delta$ denote the gradient and Laplacian operators, respectively, with respect to the space variables. The continuous diffusion equation may be discretized on a square lattice. Using a 4-nearest-neighbors discretization of the Laplacian operator, the equation becomes:

$$P_{x,y}^{t+1} = P_{x,y}^{t} + \lambda[c_N \cdot \nabla_N P + c_S \cdot \nabla_S P + c_E \cdot \nabla_E P + c_W \cdot \nabla_W P]_{x,y}^{t}$$

and $$\nabla_N P_{x,y} = P_{x,y-1} - P_{x,y}$$

$$\nabla_S P_{x,y} = P_{x,y+1} - P_{x,y}$$

$$\nabla_E P_{x,y} = P_{x+1,y} - P_{x,y}$$

$$\nabla_W P_{x,y} = P_{x-1,y} - P_{x,y}$$

where $0 \leqq \lambda \leqq 1/4$ for numeric stability reason, N, S, E, W denote North, South, East and West, respectively. The conduction coefficients $c_N$, $c_S$, $c_E$, $c_W$ may be computed as follows:

$$c_{N_{x,y}} = g(|\nabla_N I_{x,y}|)$$

$$c_{S_{x,y}} = g(|\nabla_S I_{x,y}|)$$

$$c_{E_{x,y}} = g(|\nabla_E I_{x,y}|)$$

$$c_{W_{x,y}} = g(|\nabla_W I_{x,y}|)$$

and $$g(|\nabla I|) - \frac{1}{1 + (|\nabla I| / K)^2}$$

where K is a constant, e.g., K=1000.

This refined probability map from step 16 is then used to overlay foreground pixels on a new background. Some type of blending or feathering process should be used. Feathering as used here denotes any kind of process that does not just overlay the pixels with no comparison whatsoever between the foreground and background. Specifically, in this example, a weighted average over the pixel value of the input image and the pixel value of the new background is applied. The weights are determined by the probability value from the probability map.

The example of this feathering algorithm for a given location (x,y) in the output image, has the following formulas:

$$R^{x,y\,output} = P(p_{x,y} \in \text{Foreground}) \cdot R_{x,y}^{input} + (1 - P(p_{x,y} \in \text{Foreground})) \cdot R_{x,y}^{new\ background}$$

$$G^{x,y\,output} = P(p_{x,y} \in \text{Foreground}) \cdot G_{x,y}^{input} + (1 - P(p_{x,y} \in \text{Foreground})) \cdot G_{x,y}^{new\ background}$$

$$B^{x,y\,output} = P(p_{x,y} \in \text{Foreground}) \cdot B_{x,y}^{input} + (1 - P(p_{x,y} \in \text{Foreground})) \cdot B_{x,y}^{new\ background}$$

Once the feathering is complete in step 18, the output image with the new background is produced. While the input may be a video image, this technique can be used for printed output as well, such as paper, postcards, photographic paper, etc.

Several modifications of this process are possible. As mentioned previously, the above example relies upon RGB color space for discussion purposes. Other types of processing, including $YC_bC_r$, can be used. The selection of the number of frames used is also left up to the designer. It is possible that several frames could be analyzed with associated motion analysis as well, to ensure the highest accuracy of the fore/back ground classification. The use of the nearest neighbor is not limited to four neighbors. The selection of these specifics is left to the designer based upon the computational power of the system and the requirements of the final image.

Similarly, while the above process relies upon anisotropic diffusion for the refinement of classification, other types of refinements are available, such as morphological filtering, as mentioned above.

Application of this invention results in several options for users. A video conference participant can shield the actual background of the room from those at the receiving end of the image, for privacy or security reasons.

A Web publisher can generate transparent images in GIF format much more quickly than presently possible. Current techniques involve a pixel by pixel designation by the user to identify foreground and background pixels, a painstaking and tedious process. These same techniques are required when consumers using digital cameras want to crop and move objects in their digital images, whether video or still. These problems are eliminated by the application of this invention.

Thus, although there has been described to this point a particular embodiment for a method to perform background replacement, it is not intended that such specific references be considered as limitations upon the scope of this invention except in-so-far as set forth in the following claims.

What is claimed is:

1. A method for background replacement in image capture systems, the method comprising:

recording a background of an image with no foreground object with an image capture device, wherein the background is used as an input to a probability function;

using said image capture device to capture an input image having a foreground object;

classifying each pixel in said input image as a foreground pixel or a background pixel wherein classification results from calculating the probability function directly from a formula using chromatic component values and intensity values in the probability function for each pixel in the input image producing a classification and a probability map simultaneously;

refining said classification and probability map to ensure proper classification;

replacing said background pixels with pixels from a different background, wherein said replacing is performed with feathering using weighted values for pixel values of the input image and the different background determined by the probability map; and producing an output image comprised of said foreground pixels and said pixels from a different background.

2. The method as claimed in claim 1 where refining is performed in the normalized RGB chromatic color space.

3. The method as claimed in claim 1 wherein refining is performed in YCbCr color space.

4. The method as claimed in claim 1 wherein said input image comprises one frame of video data.

5. The method as claimed in claim 1 wherein said input image comprises more than one frame of video data.

6. The method as claimed in claim 1 wherein said input image comprises a still image.

7. The method as claimed in claim 1, wherein said refining is performed with anisotropic diffusion.

8. The method as claimed in claim 1, wherein said refining is performed with morphological filtering.

9. The method as claimed in claim 1, wherein said output image is a video image.

10. The method as claimed in claim 1, wherein said output image is a still image.

* * * * *